US011267520B2

(12) United States Patent
Vollertsen

(10) Patent No.: US 11,267,520 B2
(45) Date of Patent: Mar. 8, 2022

(54) SPOILER ASSEMBLY

(71) Applicant: ZENVO AUTOMOTIVE A/S, Præstø (DK)

(72) Inventor: Troels Vollertsen, Præstø (DK)

(73) Assignee: ZENVO AUTOMOTIVE A/S, Præstø (DK)

( * ) Notice: Subject to any disclaimer, the term of this patent is extended or adjusted under 35 U.S.C. 154(b) by 14 days.

(21) Appl. No.: 16/916,392

(22) Filed: Jun. 30, 2020

(65) Prior Publication Data

US 2021/0009212 A1 Jan. 14, 2021

Related U.S. Application Data

(63) Continuation of application No. PCT/DK2019/050008, filed on Jan. 10, 2019.

(30) Foreign Application Priority Data

Jan. 25, 2019 (DK) .......................... PA 2018 00042

(51) Int. Cl.
*B62D 37/02* (2006.01)
*B62D 35/00* (2006.01)
(52) U.S. Cl.
CPC ........... *B62D 37/02* (2013.01); *B62D 35/007* (2013.01)
(58) Field of Classification Search
CPC .............................. B62D 37/02; B62D 35/007
See application file for complete search history.

(56) References Cited

U.S. PATENT DOCUMENTS

| 2,976,077 | A | 3/1961 | Totton |
| 9,403,564 | B1 | 8/2016 | Al-Huwaider |
| 2016/0236728 | A1 | 8/2016 | Al-Huwaider |
| 2017/0088194 | A1 | 3/2017 | Heil |
| 2017/0088201 | A1* | 3/2017 | Heil ..................... B62D 35/007 |
| 2019/0061843 | A1 | 2/2019 | Fahland et al. |
| 2019/0092402 | A1 | 3/2019 | Fahland et al. |
| 2019/0092403 | A1* | 3/2019 | Bray ..................... G05B 15/02 |

FOREIGN PATENT DOCUMENTS

| DE | 10245463 A1 | 12/2005 |
| DE | 102018120603 A1 | 2/2019 |
| DE | 102018123474 A1 | 3/2019 |
| JP | H02125893 U | 10/1990 |
| JP | H068170 U | 2/1994 |

(Continued)

OTHER PUBLICATIONS

Additional search report for Danish Patent Appl. No. PA 2018 00042 dated Oct. 16, 2018.

(Continued)

*Primary Examiner* — Lori L Lyjak
(74) *Attorney, Agent, or Firm* — Elevated IP, LLC

(57) ABSTRACT

A spoiler assembly (2) for a car (4) is disclosed. The spoiler assembly (2) comprises a support structure (10) and body portion (30) moveably mounted to the support structure (10). The support structure (10) is configured to be attached to the car (4). The spoiler assembly (2) comprises one or more actuators (14, 14', 16, 16') for changing the orientation of the body portion (30), wherein the body portion (30) is arranged to be rotated with respect to the direction of travel (X) of the car (4).

17 Claims, 8 Drawing Sheets

(56) References Cited

FOREIGN PATENT DOCUMENTS

| | | |
|---|---|---|
| JP | H0646781 U | 6/1994 |
| KR | 101481369 B1 | 1/2015 |
| WO | WO-2017123640 A2 * | 7/2017 ........... B62D 35/007 |

OTHER PUBLICATIONS

International search report for corresponding PCT/DK2019/050008 dated Apr. 8, 2019.
Search report for corresponding Danish Appl. No. PA 2018 00042 dated Jul. 24, 2018.

* cited by examiner

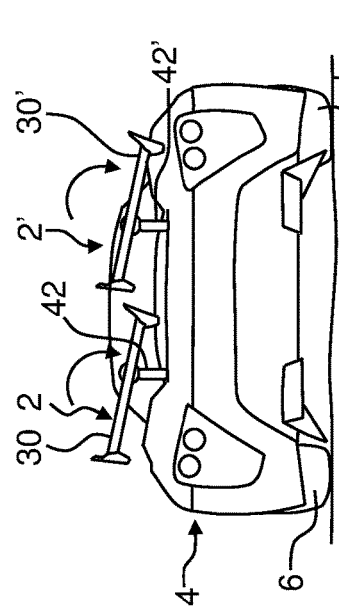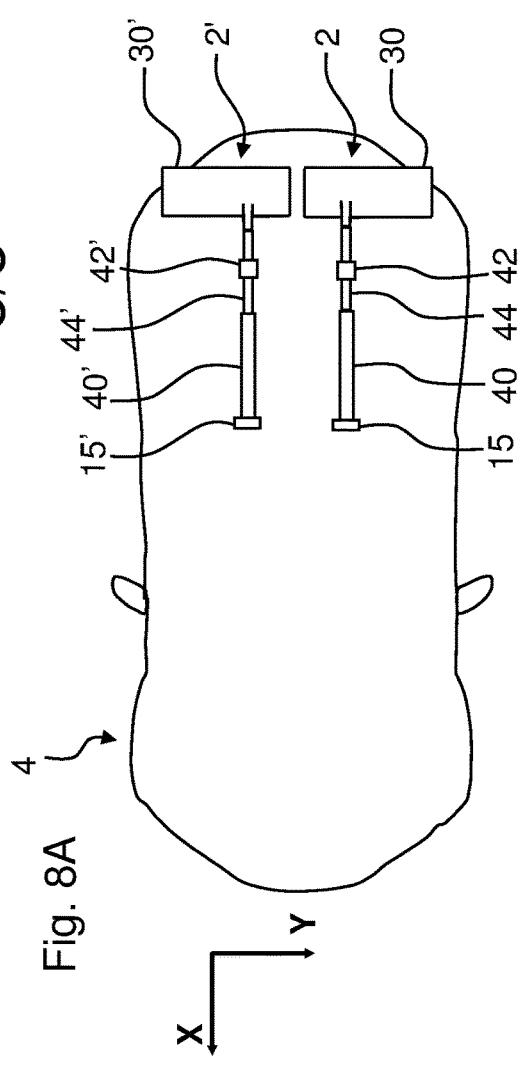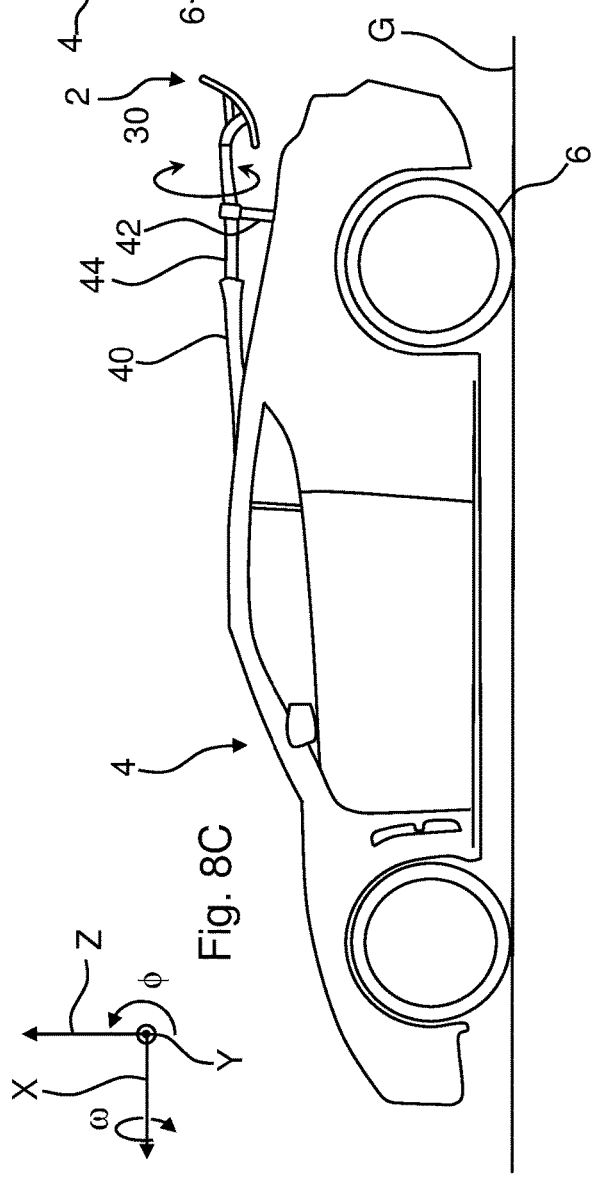

SPOILER ASSEMBLY

CROSS-REFERENCE TO RELATED APPLICATIONS

This application is a continuation under 35 U.S.C. 111 of International Patent Application No. PCT/DK2019/050008, filed Jan. 10, 2019, which claims the benefit of and priority to Danish Application No. PA 2018 00042, filed Jan. 25, 2018, both of which are hereby incorporated by reference in their entireties.

FIELD OF INVENTION

The present invention relates to a spoiler for a car and a method for applying a spoiler.

BACKGROUND

It is known to provide cars with aerodynamic spoiler arrangements operative to apply substantial aerodynamic anti-lift forces to the vehicle to improve the traction of its wheels and its general maneuverability. This is particularly advantageous during higher speeds of operation.

Typical prior art aerodynamic spoiler arrangements are mounted directly to the car body and/or chassis and are applied to provide aerodynamic anti-lift and braking forces for use while traveling in a straight path. The prior art aerodynamic spoiler arrangements can, however, not be used to control the traction of car wheels to a satisfactory degree when the car is traveling fast through a corner/curve.

Thus, there is a need for a spoiler assembly and a method that makes it possible to control the traction of car wheels to a satisfactory degree when the car is traveling fast through a curve.

US2017088194A1 discloses a method of controlling an active aerodynamic element for a vehicle. The method includes determining a target position for the active aerodynamic element from a target aerodynamic force, which may be a given value that is provided based on dynamic conditions of the vehicle. The method actuates the active aerodynamic element to the target position and senses an aerodynamic response characteristic of the active aerodynamic element while actuated to the target position. An estimated applied aerodynamic force is determined from the aerodynamic response characteristic, and is compared to the target aerodynamic force. A force error is determined from the comparison of the estimated applied aerodynamic force and the target aerodynamic force, and a modified position for the active aerodynamic element is determined from the force error and the target aerodynamic force. The active aerodynamic element is actuated to the modified position. US2017088194A1 discloses a spoiler assembly for a car comprising a support structure attached to the car. The spoiler assembly comprises an actuator configured to change the orientation of the spoiler but only by rotation with respect to an axis perpendicular to the direction of travel of the car.

SUMMARY

It is an object of the invention to provide a spoiler assembly and a method that makes it possible to control the traction of car wheels to a satisfactory degree when the car is traveling fast through a curve.

It is also an object of the invention to provide a spoiler assembly and a method that makes it possible to improve the downforce during cornering of a vehicle, including the lateral downforce.

The object of the present invention can be achieved by a spoiler assembly disclosed herein. Preferred embodiments are defined in the claims, explained in the following description, and illustrated in the accompanying drawings.

The spoiler assembly according to the invention is a spoiler assembly for a car, wherein the spoiler assembly comprises a support structure and body portion moveably mounted to the support structure, wherein the support structure is configured to be attached to the car, wherein the spoiler assembly comprises one or more actuators configured to change the orientation of the body portion, wherein the body portion is arranged to be rotated with respect to the direction of travel of the car.

Hereby, it is possible to provide a spoiler assembly that can be used to control the traction of car wheels to a satisfactory degree when the car is traveling fast through a corner/curve.

The spoiler assembly makes it possible to provide a horizontal force that prevents the car from skidding while traveling fast in a corner/curve.

The spoiler assembly is configured to be used on a car.

In a preferred embodiment, the spoiler assembly is configured to be attached on the rear end of a car.

In another embodiment, the spoiler assembly is configured to be attached on the front end of a car.

In a further embodiment the spoiler assembly is configured to be attached on a central portion a car.

The spoiler assembly comprises a support structure and a body portion moveably mounted to the support structure. The support structure may have any suitable form. In one embodiment, the support structure is attached to the body portion in a single position.

In another embodiment, the support structure is attached to the body portion in several positions.

The support structure may be attached to the car in a single attachment area. In another embodiment, the support structure is attached to the car in several attachment areas.

The body portion may have any suitable shape. In a preferred embodiment, the body portion is shaped as an elongate structure.

The body portion may be made in any suitable material including metal, composite or wood. In a preferred embodiment, the body portion is made from carbon fiber reinforced plastic in order to achieve a lightweight and durable spoiler assembly.

The support structure is configured to be attached to the car.

The attachment of the support structure to the car may be carried out by using any suitable attachment methods including brackets and joints of any suitable type and size.

The spoiler assembly comprises one or more actuators configured to change the orientation of the body portion. The one or more actuators may be hydraulic, electrical or pneumatic. In a preferred embodiment, the one or more actuators may be hydraulic.

The body portion is arranged to be rotated with respect to the direction of travel of the car. This means that the body portion upon activation of the one or more actuators is pivoted in a "side to side" manner, whereby a horizontal force exerting onto the car is achieved. Accordingly, the horizontal force can reduce the risk of skidding while traveling fast in a corner/curve.

It may be an advantage that the spoiler assembly comprises a joint by means of which the body portion is attached to the support structure.

Hereby, it is possible to control (and restrict) the degrees of freedom of the body portion of the spoiler assembly. Moreover, by attaching the body portion to the support structure by means of a joint it is possible to provide a reliable and controllable attachment of the body portion to the support structure.

It may be an advantage that the joint is configured to articulate with respect to the direction of travel of the car and a lateral axis extending perpendicular to the direction of travel of the car.

Hereby, it is possible to prevent undesirable motion of the body portion. It is preferred that the joint is adapted to merely pivot the body portion side to side (rotation with respect to the direction of travel of the car) and tilt the body portion forward and backward (rotation with respect to the lateral axis extending perpendicular to the direction of travel of the car, wherein the lateral axis extends perpendicular to the vertical axis).

It may be an advantage that the joint comprises a pivot extending in the travel of the car. Hereby, it is possible to pivot the body portion side to side (rotation with respect to the direction of travel of the car) by means of the pivot.

It may be beneficial that the spoiler assembly comprises one or more brackets configured to be attached to the car, wherein the support structure is attached to the one or more brackets. Hereby, it is possible to provide a reliable attachment of the support structure.

It may be advantageous that the one or more actuators are mounted in or on the one or more brackets. Hereby, a firm and reliable attachment of the one or more actuators can be achieved.

It may be an advantage that the one or more actuators are rotatably attached to a structure of the one or more brackets. Hereby, it is possible to allow the one or more actuators to rotate with respect to the one or more brackets and thus with respect to the car on which the spoiler assembly is attached.

It may be an advantage that each of the one or more actuators is attached to a joint attached to the body portion. Hereby, the actuators can be attached to the body portion in a reliable manner, in which the one or more actuators can be rotated or slid relative to the body portion.

It may be beneficial that the joint is a ball joint. Hereby, the joint allows the one or more actuators to be rotated relative to the body portion.

In another embodiment, the joint may be a hinge. A hinge joint may also allow the one or more actuators to be rotated relative to the body portion.

It may be advantageous that the one or more actuators are hydraulic. Alternatively, a pneumatic actuator or an electrical actuator may be used.

It may be an advantage that the spoiler assembly comprises two symmetrically arranged actuators. Hereby, it is possible to provide a controlled regulation of the orientation of the body portion.

It is preferred that the one or more actuators are configured to displace the body portion vertically.

It may be an advantage that the spoiler assembly is configured to be mounted on the rear of a car.

It may be beneficial that the spoiler assembly comprises a first spoiler body and a second spoiler body separated from and/or configured to be moved independently of the first spoiler body.

Hereby, it is possible to provide a spoiler assembly that can be used to carry out a more complex regulation of aerodynamic anti-lift forces to the car.

In one embodiment, the spoiler assembly comprises two separate body portions. Hereby, it is possible to rotate the body portions to a larger extent than when a single body portion of a greater length is applied.

It may be an advantage to have a car comprising a spoiler assembly according to the invention.

It may be advantageous that the spoiler assembly is arranged at the rear of the car. Hereby, it is possible to improve the general maneuverability of the car. The spoiler assembly can apply substantial aerodynamic anti-lift forces to the car in order to improve the traction of the wheels.

The method according to the invention is a method for controlling a car by means of a spoiler assembly, wherein the spoiler assembly comprises a support structure and a body portion moveably (e.g. rotatably) mounted to the support structure, wherein the support structure is configured to be attached to the car, wherein the method comprises the step of:

changing the orientation of the body portion by activating one or more actuators, wherein the method comprises the step of rotating the body portion with respect to the direction of travel of the car.

Hereby, it is possible to control the traction of car wheels to a satisfactory degree when the car is traveling fast through a corner/curve.

It may be beneficial that the method comprises the step of applying a spoiler assembly that comprises a joint by means of which the body portion is attached to the support structure, wherein a joint is configured to allow the body portion to be rotated with respect to the direction of travel of the car and with respect to a horizontal (lateral) axis perpendicular to the direction of travel of the car.

Hereby, it is possible to control the traction of the wheels in a predictable and predefined manner. Accordingly, it is possible to provide a reliable and user-friendly method.

It may be advantageous that the method comprises the step of applying a joint that is supported by a support structure attached to the car. Hereby, it is possible to provide a reliable and user-friendly method.

It may be beneficial that the method comprises the step of controlling the position and orientation of the body portion by activating a first actuator and a second activator attached to the body portion at each side of a joint. Hereby, it is possible to control the orientation of the body portion in a simple and reliable manner.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 8A shows a top view of a car provided with two spoilers;

FIG. 8B shows a rear view of the car shown in FIG. 8A;

FIG. 8C shows a side view of the car shown in FIG. 8A and FIG. 8B; and

FIG. 8D shows a rear view of a car provided with two spoilers.

DETAILED DESCRIPTION

Figure 1:
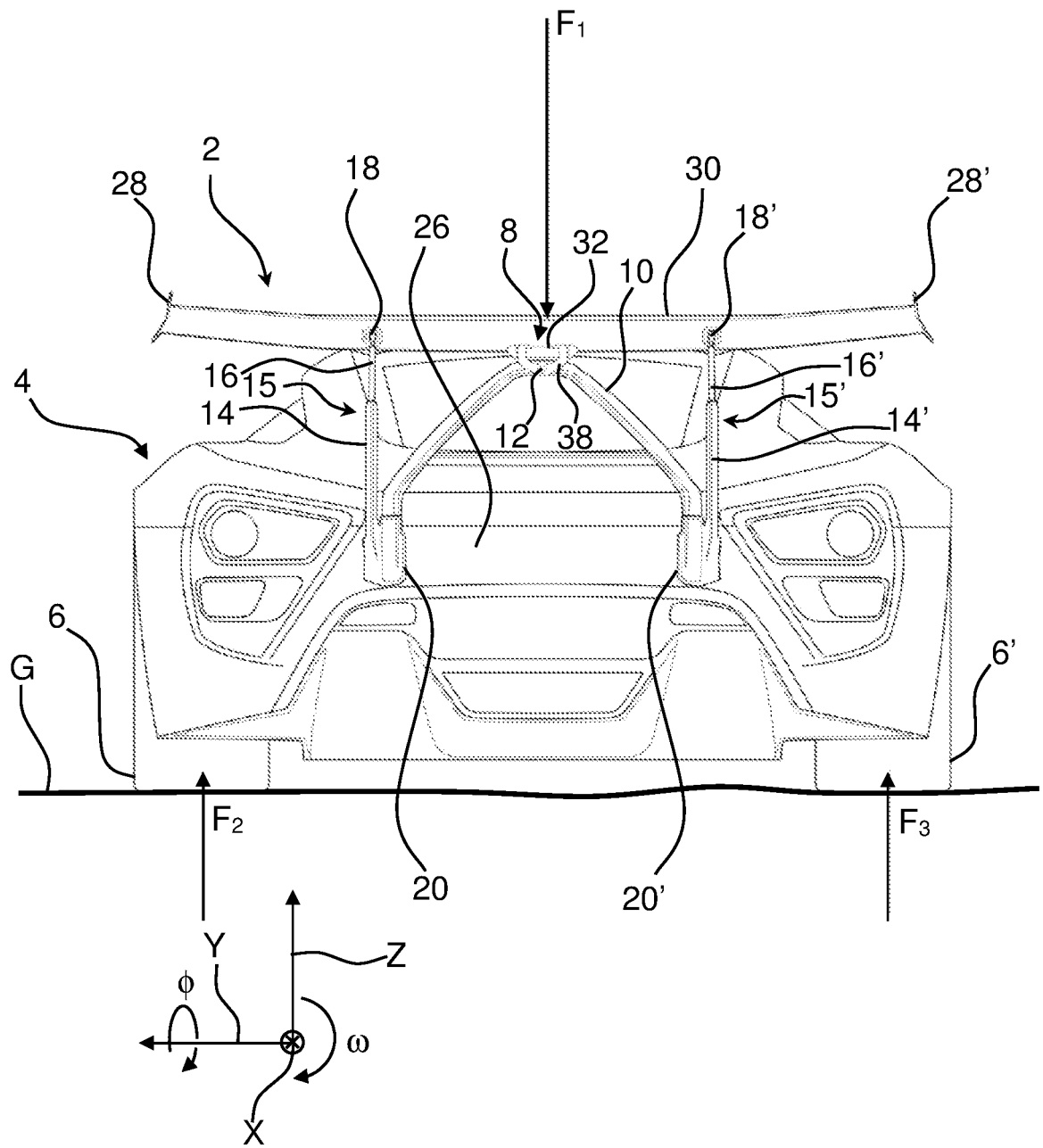
FIG. 1 shows a view of a spoiler assembly according to the invention mounted on the rear of a car.

Referring now in detail to the drawings for the purpose of illustrating preferred embodiments of the present invention, a spoiler assembly 2 of the present invention is illustrated in FIG. 1.

FIG. 1 illustrates a view of a spoiler assembly 2 according to the invention mounted on the rear of a car 4. The car 4 comprises a left rear wheel 6 and a right rear wheel 6' engaging the ground G. The spoiler assembly 2 comprises a body portion 30 provided with a first side portion 28 arranged in the left end of the body portion 30 and a second side portion 28' arranged in the opposite (right) side of the body portion 30. The spoiler assembly 2 comprises a basically A-shaped support structure 10 that is fixed to two positions of the rear portion 26 of the car 4.

The body portion 30 is mounted in a joint 8 allowing the body portion 30 to be rotated with respect to the direction of travel. The direction of travel X is indicated in the coordinate system below the car 4. This rotation is indicated with an arced arrow w. The joint 8 is also configured to allow the body portion 30 to be rotated with respect to the lateral axis Y extending perpendicular to the direction of travel X. This rotation is indicated with an arced arrow φ. The vertical direction is indicated with the vertical axis Z in the coordinate system.

The joint 8 is restricted from performing any other rotation. Accordingly, the joint 8 is adapted to merely pivot the body portion 30 side to side (rotation ω with respect to the direction of travel X) and tilt the body portion 30 forward and backward (rotation φ with respect to the lateral axis Y extending perpendicular to the direction of travel X).

The joint 8 comprises a bracket structure 32 and a bracket member 38, wherein the bracket structure 32 is rotatably mounted with respect to bracket member 38 and wherein the bracket member 38 is rotatably mounted with respect to the support structure 10 by means of a pivot 12 arranged in the upper portion of the support structure 10.

The spoiler assembly 2 comprises a first hydraulic actuator 15 comprising a cylinder portion 14 provided with a slidably mounted piston attached to a piston rod 16. The spoiler assembly 2 comprises a second hydraulic actuator 15' comprising a cylinder portion 14' provided with a slidably mounted piston attached to a piston rod 16'. Each of the two actuators 15, 15' is mounted in a corresponding bracket 20, 20', respectively. The brackets 20, 20' are attached to the rear portion 26 of the car 4. The two lower leg portions of the support structure 10 are mounted in brackets 20, 20'. Hereby, it is possible to provide a strong and rigid support of the body portion 30.

The first actuator 15 is attached to the body portion 30 by a joint 18 attached to the free end of the piston rod 16 of the first actuator 15. Likewise, the second actuator 15' is attached to the body portion 30 by a joint 18' attached to the free end of the piston rod 16' of the second actuator 15'. In one embodiment according to the invention, the joints 18, 18' are hinge joints. In another embodiment to the invention, the joints 18, 18' are ball joints.

The spoiler assembly 2 is symmetrically arranged at the rear portion 26 of the car 4.

In the configuration illustrated in FIG. 1, the body portion 30 of the spoiler assembly 2 provides a downwardly directed force $F_1$ downforce) created by the aerodynamic characteristics of the body portion 30. The downforce $F_1$ exerted onto the car 4 increases the vertical force on the tires of the wheel 6, 6', thus creating more grip. This is an advantage when the car 4 has to accelerate (during the start phase). However, it also makes it possible to travel faster through a corner/curve.

The ground G exerts a ground reaction force $F_2$, $F_3$ (normal force) onto the tire of the first wheel 6 and the second wheel 6', respectively. Since the ground G is basically horizontal, the ground reaction forces $F_2$, $F_3$ are essentially evenly distributed. Thus, it follows that:

$$F_2 = F_3 \tag{1}$$

Furthermore, since the ground reaction forces $F_2$, $F_3$ are essentially evenly distributed it follows that:

$$F_2 = F_3 = \frac{1}{2} F_1 \tag{2}$$

By increasing the ground reaction forces $F_2$, $F_3$ (normal forces), a better grip can be achieved since the friction, $F_{Friction}$ is given by the product between the normal force, $F_{Normal}$, and the coefficient of friction, μ:

$$F_{Friction} = F_{Normal} \times \mu \tag{3}$$

Figure 2:
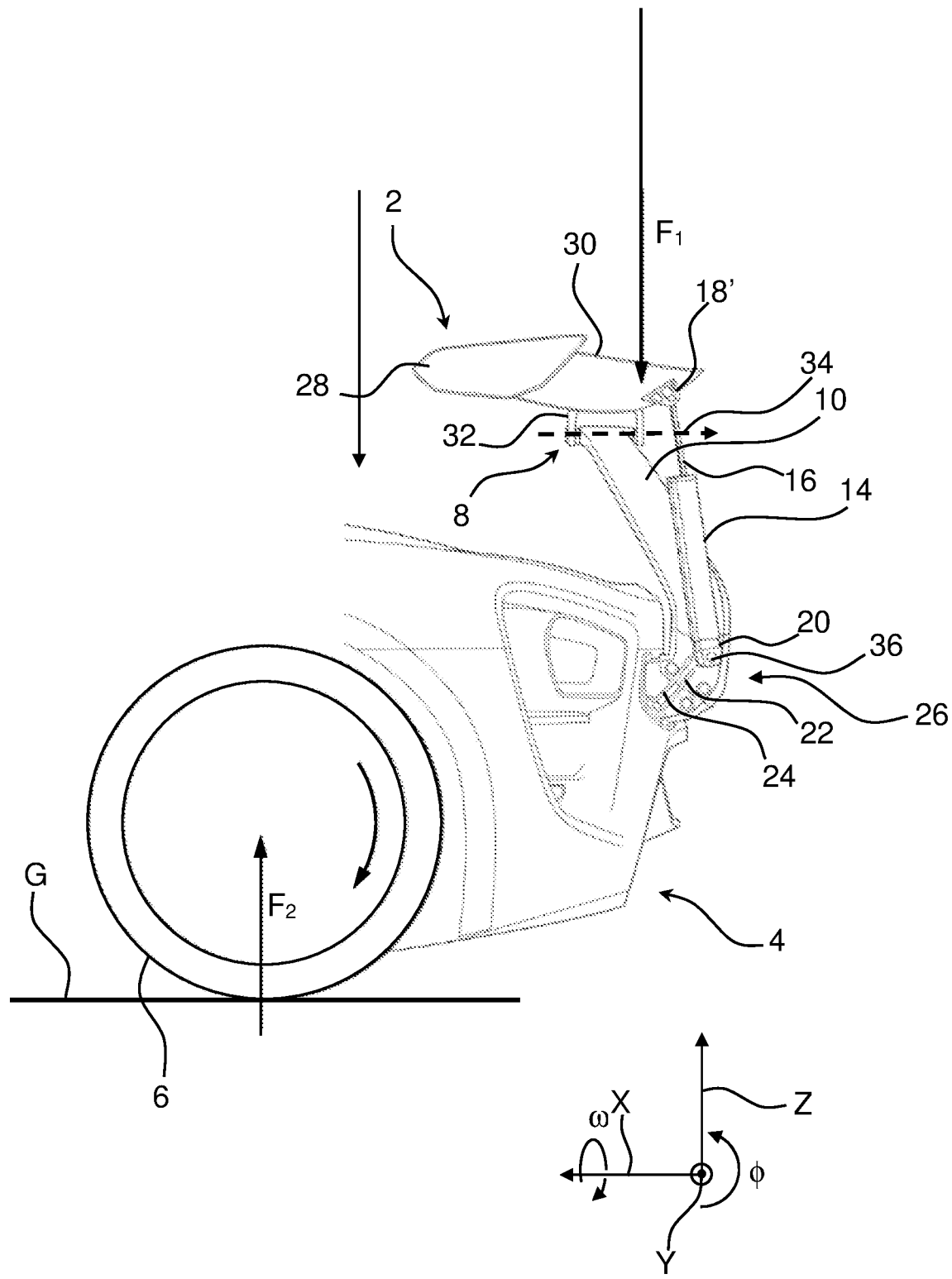
FIG. 2 shows a side view of a spoiler assembly according to the invention mounted on the rear of a car.

FIG. 2 illustrates a side view of a spoiler assembly 2 according to the invention mounted on the rear 26 of a car 4 provided with a ground engaging wheel 6.

The spoiler assembly 2 comprises a body portion 30 provided with a plate-shaped side portion 28 provided at the left end portion of the body portion 30. The spoiler assembly 2 comprises a support structure 10 fixed to the rear portion 26 of the car 4 by means of a bracket 20.

The body portion 30 is rotatably attached to the support structure 10 by means of a joint 8 comprising a U-shaped bracket structure 32. The U-shaped bracket structure 32 comprises two arm members rotatably attached to a pivot having an axis of rotation 34 indicated by a dotted arrow. The body portion 30 is configured to be rotated with respect to the direction of travel X as indicated in the coordinate system below the car 4.

The body portion 30 is attached to a hydraulic actuator 15 comprising a cylinder portion 14, a piston slidably arranged therein and a piston rod 16 extending from the cylinder portion 14. The piston rod 16 of the actuator 15 is attached to the body portion 30 by means of a joint 18 attached in the free end of the piston rod 16. The joint 18 allows the body portion to be rotated in a "side to side" manner (rotation ω with respect to the direction of travel X) and in a "forward and backward" manner (rotation φ with respect to the lateral axis Y extending perpendicular to the direction of travel X).

The bracket 20 comprises a pivot 36 allowing the cylinder portion 14 of the actuator 15 to be rotated in a "forward and backward" manner (rotation φ with respect to the lateral axis Y extending perpendicular to the direction of travel X).

Hydraulic oil is delivered to and received from the hydraulic actuator 15 by means of hydraulic pipes 22, 24. The car 4 comprises a control unit (not shown) configured to control the pressure delivered to the actuator 15. The car 4 moreover comprises a hydraulic pump arranged and configured to pressurize the hydraulic fluid used to pressurize the actuator 15.

The control unit may be configured to control one or more actuators 15 of the spoiler assembly 2 by using sensor information delivered by one or more sensors integrated in the car 4. The car 4 may be provided with one or more pressure sensors configured to detect the pressure within a hydraulic circuit of the car 4. The car 4 may comprise an accelerometer or a gyrometer configured to detect kinematic data of the car 4. These data may be sent to the control unit in order to allow the control unit to control the one or more actuators 15 on the basis of said data. By way of example, during a heavy acceleration the actuator(s) may increase the downforce in order to increase the friction and thus the grip of the car 4.

The spoiler assembly 2 provides a downforce $F_1$, which creates a ground reaction force (normal force) $F_2$ increasing the friction and thus the grip of the car 4. The spoiler assembly 2, however, also introduces a breaking torque $M_1$ that will decelerate the car 4. Accordingly, the motor (not shown) of the car 4 will have to deliver an additional torque in order to counteract the breaking torque $M_1$ caused by the spoiler assembly 2.

Figure 3:
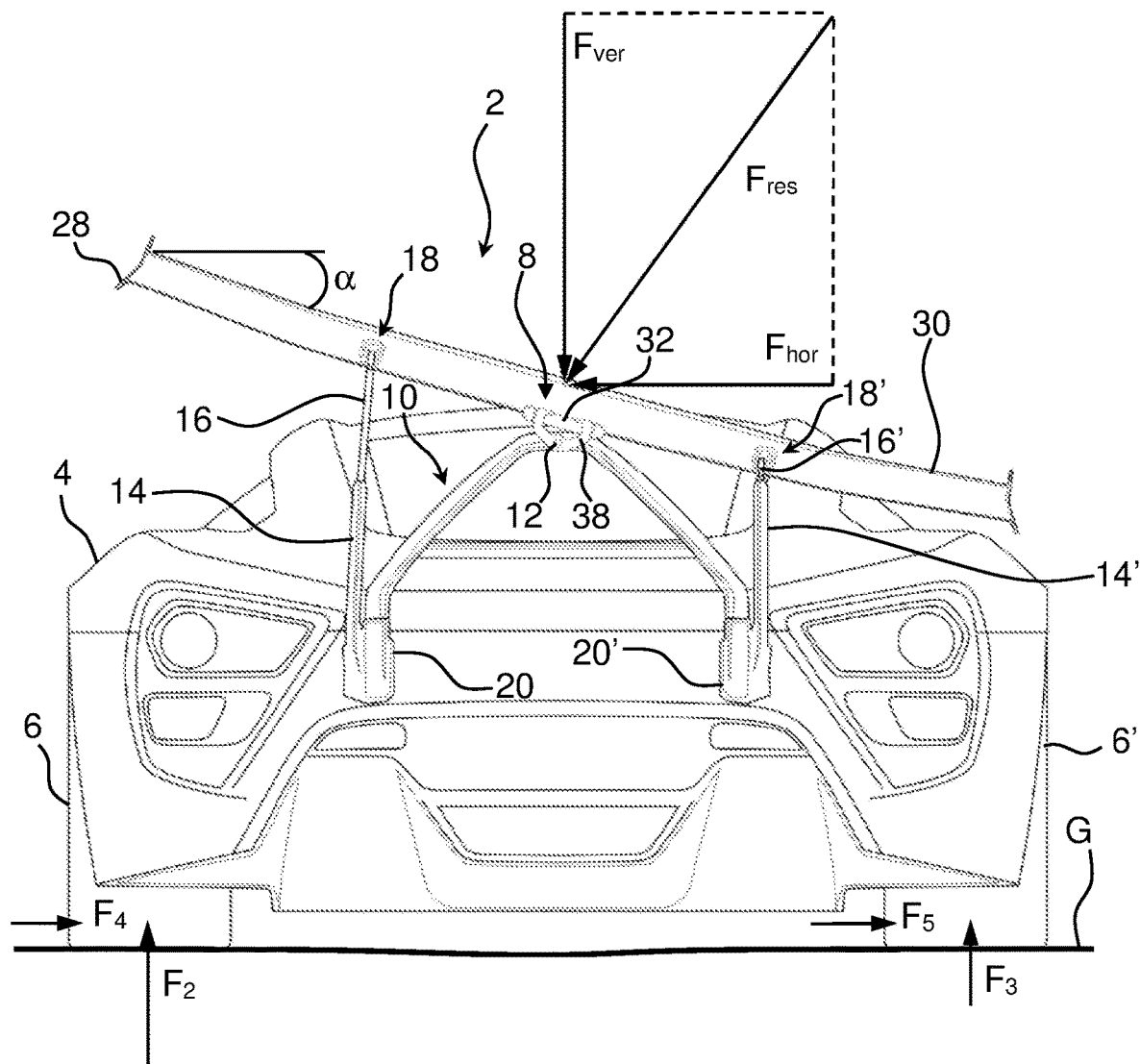
FIG. 3 shows a view of the spoiler assembly shown in FIG. 1, in a configuration in which the body portion of the spoiler assembly has been rotated with respect to the direction of travel of the car.

FIG. 3 illustrates a view of the spoiler assembly 2 shown in FIG. 1, in a configuration in which the body portion 30 of the spoiler assembly 2 has been rotated clockwise with respect to the direction of travel X of the car 4. A coordinate system illustrating the direction of travel X, the vertical axis Z and the lateral axis Y extending perpendicular to the direction of travel X and the vertical axis Z, is shown below the car 4.

The car 4 is provided with a left rear wheel 6 and a right rear wheel 6' engaging the ground G. The spoiler assembly 2 has a body portion 30 comprising a first side portion 28 arranged in the left end of the body portion 30 and a second side portion 28' arranged in the opposite (right) side of the body portion 30. The spoiler assembly 2 is provided with a basically A-shaped support structure 10 fixed to two positions of the car 4.

The body portion 30 is attached to the support structure 10 by means of a joint 8 constructed to permit the body portion 30 to be rotated with respect to the direction of travel (indicated with an arced arrow w) and with respect to the lateral axis Y extending perpendicular to the direction of travel X (indicated with an arced arrow 1). Hereby, the joint 8 can only be rotated about these axes of rotation. The joint 8 is adapted to purely pivot the body portion 30 side to side (rotation ω with respect to the direction of travel X) and tilt the body portion 30 forward and backward (rotation φ with respect to the lateral axis Y extending perpendicular to the direction of travel X).

The body portion 30 and the bracket structure 32 of the joint 8 has been rotated with respect to the longitudinal axis of the pivot 12 (that extends along the direction of travel X).

The spoiler assembly 2 has a first hydraulic actuator 15 and a second actuator 15' each comprising a cylinder portion 14, 14' provided with a slidably mounted piston attached to a piston rod 16, 16'. Each of the two actuators 15, 15' is mounted in a corresponding bracket 20, 20' attached to the rear portion 26 of the car 4. The two lower leg portions of the support structure 10 are mounted in brackets 20, 20'.

The first actuator 15 is attached to the body portion 30 by a joint 18 attached to the free end of the piston rod 16 of the first actuator 15. Similarly, the second actuator 15' is attached to the body portion 30 by a joint 18' attached to the free end of the piston rod 16' of the second actuator 15'. It can be seen, that the spoiler assembly 2 is symmetrically arranged at the rear portion 26 of the car 4.

In the configuration illustrated in FIG. 3, the body portion 30 of the spoiler assembly 2 has been rotated with respect to the direction of travel X. Accordingly, there is a non-zero angle α between the body portion 30 and horizontal. The spoiler assembly 2 provides a resulting force $F_{res}$ onto the car 4 created by the aerodynamic characteristics of the body portion 30.

The resulting force $F_{res}$ can be divided into a downwardly directed force $F_{ver}$ (downforce) and a horizontal force $F_{hor}$. This can be expressed in the following way:

$$F_{res}=F_{ver}+F_{hor} \tag{4}$$

The downforce $F_{ver}$ exerted onto the car 4 increases the vertical force on the tires of the wheels 6, 6', thus creating more grip. The left wheel 6 experiences a larger downforce than the right wheel 6'. Accordingly, the ground reaction force $F_2$ exerted onto the left wheel 6 is larger than the ground reaction force $F_3$ exerted onto the right wheel 6'. This can be expressed in the following equation:

$$F_2 > \tfrac{1}{2} F_{ver} > F_3 \tag{5}$$

The horizontal force $F_{hor}$ exerted onto the car 4 causes a horizontal ground reaction force $F_4$ exerted to the left rear wheel 6 and a horizontal ground reaction force $F_5$ exerted to the right rear wheel 6'. As the horizontal force is basically evenly distributed between the two rear wheels 6, 6', this can be expressed in the following equation:

$$F_5 \approx F_4 \approx \tfrac{1}{2} F_{hor} \tag{6}$$

The added horizontal ground reaction forces $F_4$, $F_5$ are of major advantage when the car 4 has to travel fast through a corner/curve.

By activating the actuators 15, 15', it is possible to change the orientation of the body portion 30 of the spoiler assembly 2. Hereby, the spoiler assembly can increase the speed with which a car can travel through a corner/curve.

It may be an advantage that the car 4 comprises a control unit (not shown) arranged and configured to control the actuators 15, 15'. The control unit may preferably be supplied with a sensor delivering data including the speed of the car 4, since the speed of the car 4 is a major determinant of force exerted to the car 4 due to the aerodynamic characteristics of the body portion 30.

Figure 4:
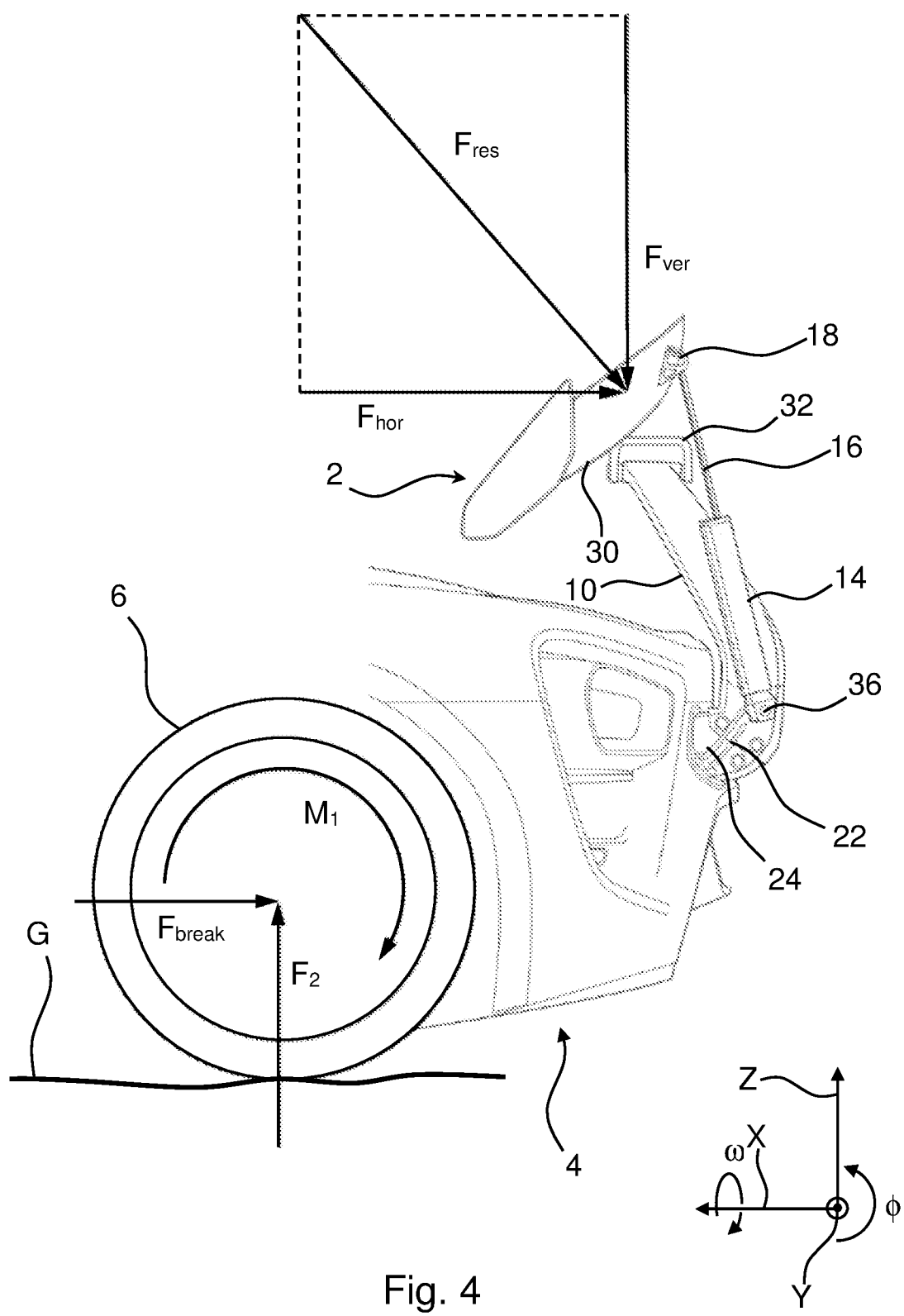
FIG. 4 shows a side view of the spoiler assembly shown in FIG. 2, in a configuration in which the body portion of the spoiler assembly has been rotated with respect to the direction of travel of the car.

FIG. 4 illustrates a side view of the spoiler assembly 2 shown in FIG. 2, in a configuration in which the body portion 30 of the spoiler assembly 2 has been rotated with respect to the direction of travel X of the car 4. A coordinate system illustrating the direction of travel X, the vertical axis Z and the lateral axis Y extending perpendicular to the direction of travel X and the vertical axis Z, is shown below the car 4.

The body portion 30 of the spoiler assembly 2 has been rotated with respect to the lateral axis Y. Accordingly, the spoiler assembly 2 provides a resulting force $F_{res}$ onto the car 4, wherein the resulting force $F_{res}$ has a component $F_{hor}$ that will deaccelerate the car 4.

The resulting force $F_{res}$ can be divided into a downwardly directed force $F_{ver}$ (downforce) and a horizontal force $F_{hor}$. As previously explained this can be expressed in the following way:

$$F_{res} = F_{ver} + F_{hor} \tag{4}$$

The downforce $F_{ver}$ exerted onto the car 4 increases the vertical force on the tires of the wheel 6, thus creating more grip and capacity to reduce the speed of the car 4.

The horizontal force $F_{hor}$ causes a breaking force $F_{break}$ to be exerted onto the car 4. Accordingly, the spoiler assembly 2 will create a torque $M_2$ that will deaccelerate the car 4. The torque $M_2$ is larger than the torque $M_1$ shown in FIG. 2. Accordingly, a larger breaking effect is achieved when the body portion 30 of the spoiler assembly 2 is orientated as illustrated in FIG. 4.

Figure 5:
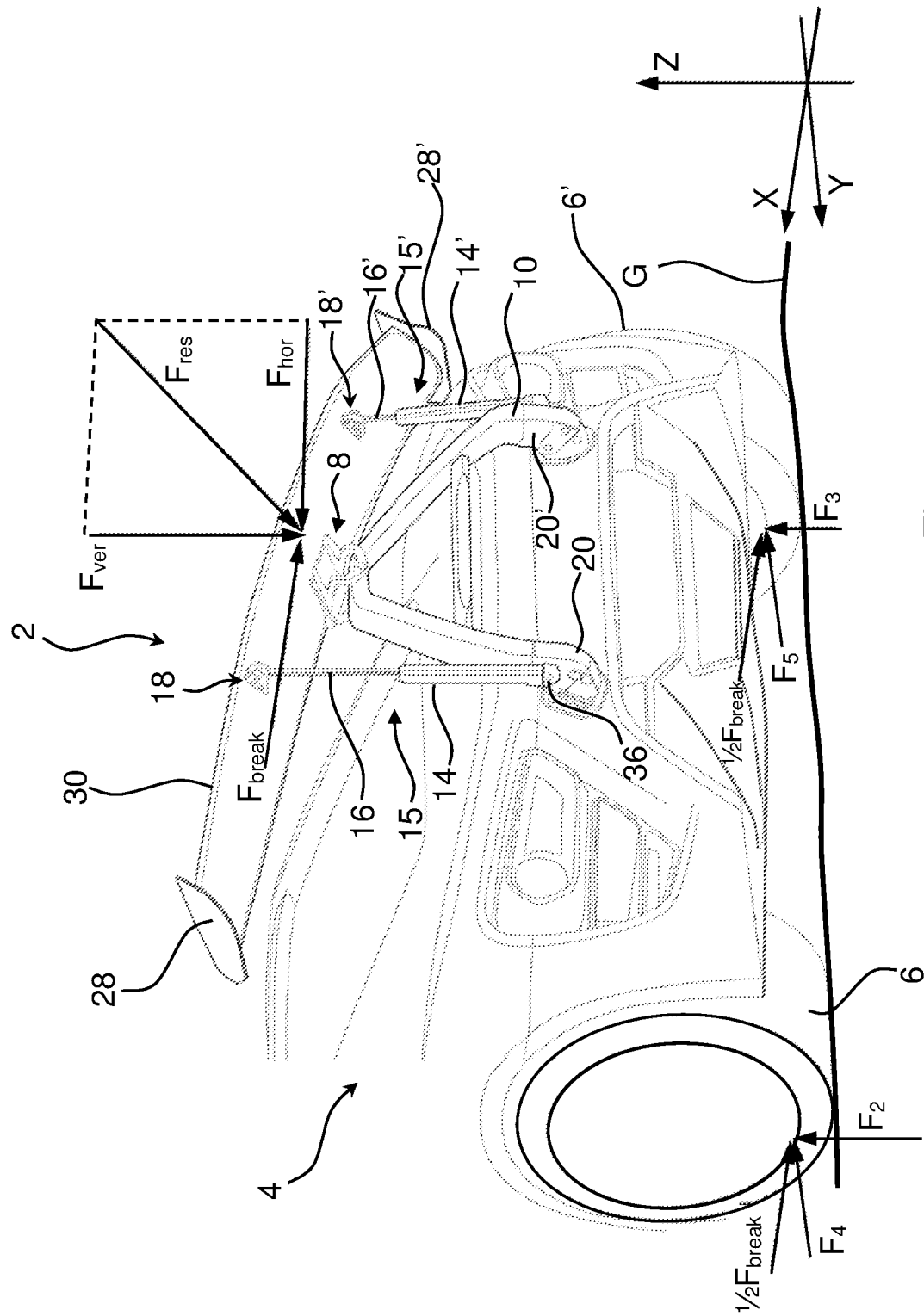
FIG. 5 shows a perspective rear view of a spoiler assembly according to the invention, in a configuration in which the body portion of the spoiler assembly has been rotated with respect to the direction of travel of the car.

FIG. 5 illustrates a perspective rear view of a spoiler assembly 2 according to the invention, in a configuration in which the body portion 30 of the spoiler assembly 2 has been rotated with respect to the direction of travel X of the car 4. The spoiler assembly 2 is oriented as illustrated in FIG. 3, however, it is seen from a different perspective.

It can be seen, that the piston rod 16 of the left actuator 15 has displaced the joint 18 and hereby the left side of the body portion 30. The right actuator 15' has, however, not displaced the joint 18' in a corresponding manner. Accordingly, the body portion 30 is rotated relative to the direction of travel X of the car 4. Accordingly, the spoiler assembly 2 provides a resulting force $F_{res}$ onto the car 4, wherein the resulting force $F_{res}$ has:

a) a component $F_{break}$ extending in the direction of travel X of the car 4,
b) a component $F_{hor}$ extending in the lateral direction Y perpendicular to the vertical axis Z and the direction of travel X and
c) a vertical component $F_{ver}$ constituting a downforce.

These force components exert forces onto the wheels 6, 6' of the car 4. Each wheel 6, 6' experiences:
a) a breaking force $½F_{break}$ that decelerates the car 4,
b) horizontal forces $F_4$ and $F_5$, respectively and
c) vertical forces (downforces) $F_2$ and $F_3$, respectively.

Figure 6B:
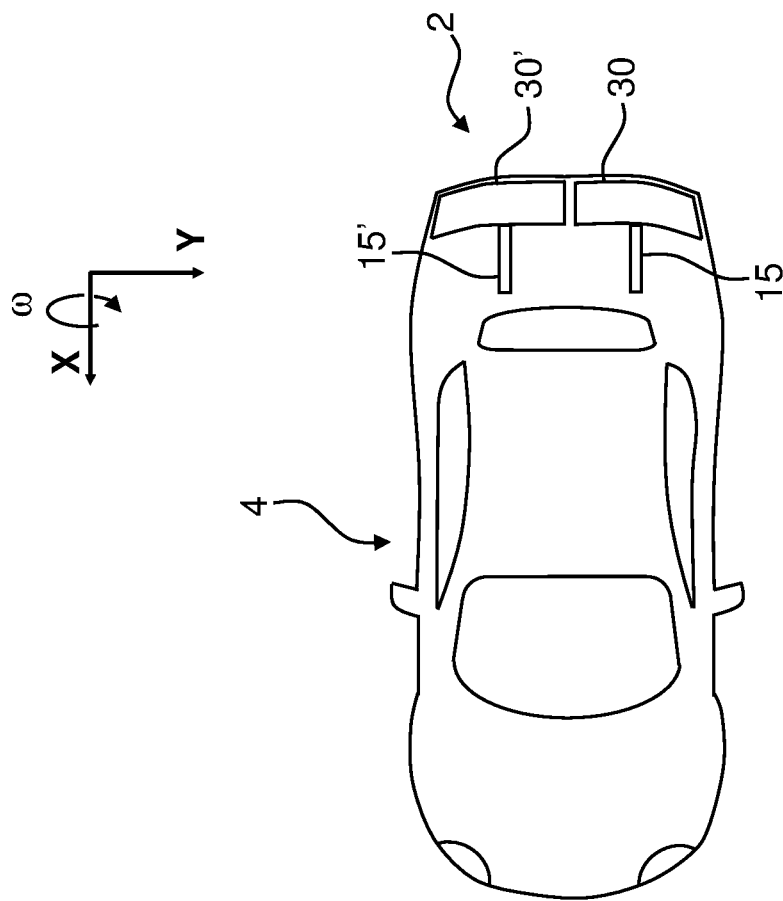
FIG. 6B shows a top view of another spoiler assembly according to the invention comprising two body portions.
Figure 6A:
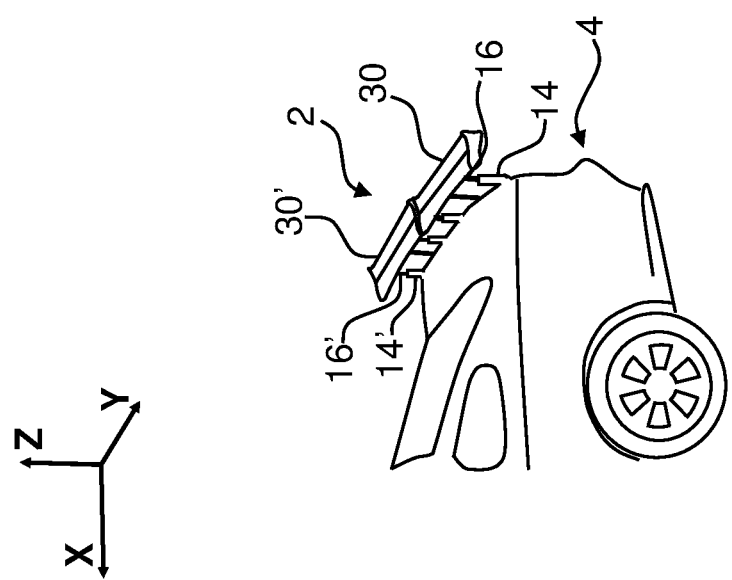
FIG. 6A shows a perspective side view of a spoiler assembly according to the invention comprising two body portions.

FIG. 6A illustrates a perspective side view of a spoiler assembly 2 according to the invention comprising two body portions 30, 30' mounted side by side. The first body portion 30 and the second body portion 30' extend in extension of each other. It may be an advantage that the first body portion 30 and the second body portion 30' are basically equally shaped.

The first body portion 30 and the second body portion 30' are mounted on the rear end of a car 4 by means of a centrally arranged attachment unit comprising a joint to which the body portion 30, 30' is rotatably attached. The first body portion 30 and the second body portion 30' are arranged and configured to be displaced using hydraulic actuators comprising a hydraulic cylinder 14, 14' and a piston rod 16, 16' slidably arranged in the hydraulic cylinder 14, 14'.

FIG. 6B illustrates a top view of another spoiler assembly 2 according to the invention comprising two body portions 30, 30'. Each of the body portions 30, 30' is attached to an actuator 15, 15' formed as a rotatably mounted shaft. Accordingly, the body portions 30, 30' can be rotated with respect to the direction of travel X (illustrated in the coordinate system shown above the car 4).

Figure 7A:
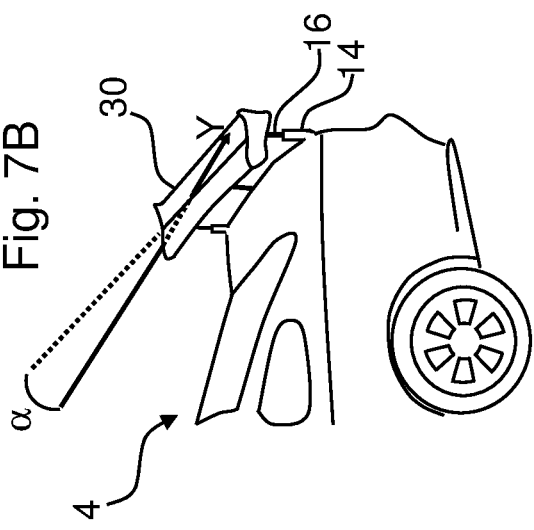
FIG. 7A shows a perspective side view of a spoiler assembly according to the invention in a first configuration.
Figure 7B:
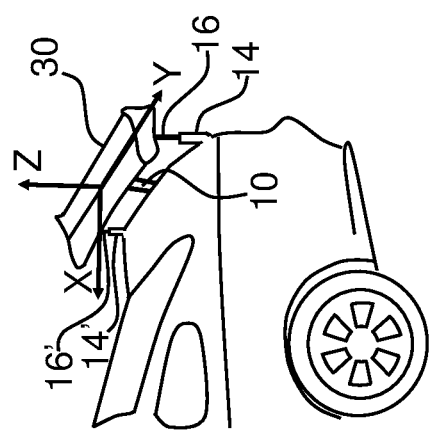
FIG. 7B shows a perspective side view of the spoiler assembly shown in FIG. 7A in a second configuration.

FIG. 7A illustrates a perspective side view of a spoiler assembly 2 according to the invention in a first configuration and FIG. 7B illustrates a perspective side view of the spoiler assembly shown in FIG. 7A in a second configuration, in which the body portion 30 of the spoiler assembly 2 is angled relative to horizontal Y due to a rotation with respect to the direction of travel X of the car 4. The angle α between the longitudinal axis of the body portion 30 and horizontal Y is indicated in FIG. 7B.

The orientation of the body portion 30 is regulated by using two actuators provided in each side of a centrally arranged support structure 10. Each actuator comprises a hydraulic cylinder 14, 14' and a piston rod 16, 16' slidably arranged in the hydraulic cylinder 14, 14'.

Figure 7C:
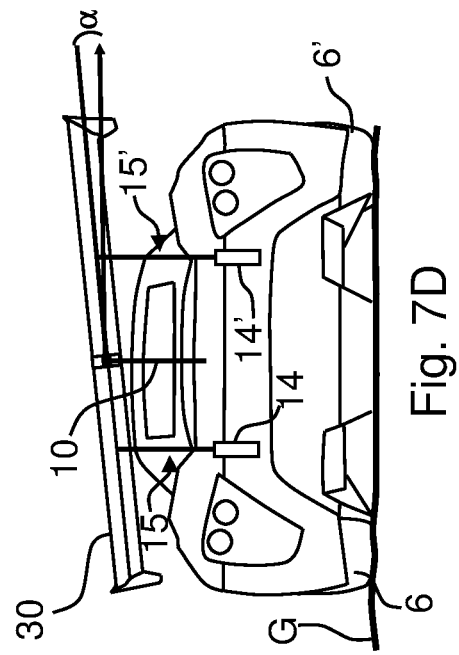
FIG. 7C shows a rear view of a spoiler assembly according to the invention in a first configuration.
Figure 7D:
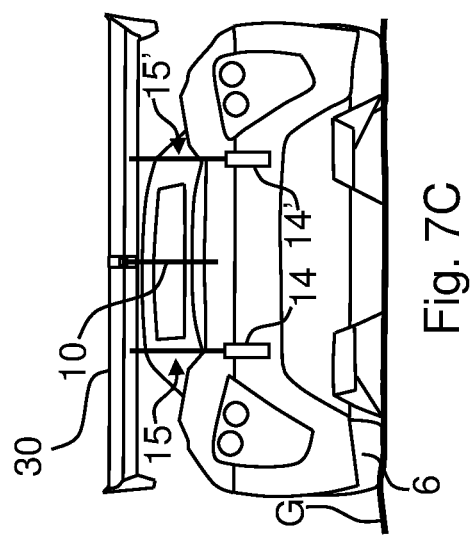
FIG. 7D shows a perspective side view of the spoiler assembly shown in FIG. 7C in a second configuration.

FIG. 7C illustrates a rear view of a spoiler assembly 2 according to the invention in a first configuration and FIG. 7D illustrates a perspective side view of the spoiler assembly 2 shown in FIG. 7C in a second configuration, in which the body portion 30 of the spoiler assembly 2 is angled relative to horizontal due to a rotation with respect to the direction of travel of the car 4. The angle α between the longitudinal axis of the body portion 30 and horizontal is indicated in FIG. 7D. The car 4 comprises rear wheels 6, 6' engaging the ground G. The spoiler assembly 2 comprises two actuators 15, 15' provided at each side of a centrally arranged support structure 10 having a joint in its distal (top) end. The actuators 15, 15' are hydraulic actuators comprising a hydraulic cylinder 14, 14' and a piston rod 16, 16' extending therefrom. The distal end of the piston rod 16, 16' is attached to the body portion 30. Accordingly, the actuators 15, 15' can change the orientation of the body portion 30 e.g. from a configuration as shown in FIG. 7C to a configuration as shown in FIG. 7D or vice versa.

FIG. 8A illustrates a top view of a car 4 provided with a spoiler assembly 2 mounted at the rear end of the car 4, whereas FIG. 8B illustrates a rear view of a car 4 basically corresponding to the one shown in FIG. 8A. The spoiler assembly 2 comprises two body portions 30, 30' each being attached to a shaft 44, 44' that is rotatably mounted in a corresponding shaft sleeve 40, 40'. Each shaft 44, 44' is driven by an actuator 15, 15' provided in the proximal end of the shaft 44, 44'.

Each shaft is supported by a shaft support 42, 42' that rests on the car 4. The shafts 44, 44' are parallel and extend along the direction of travel X. The car 4 has ground-engaging wheels 6, 6' engaging the ground G. Each body portion 30, 30' has been rotated clockwise relative to horizontal.

FIG. 8C illustrates a side view of a car 4 that essentially corresponds to the one shown in FIG. 8A and FIG. 8B. The car 4 has wheels 6 engaging the ground G and a spoiler 2 comprising a body portion 30. The shaft 44 of the spoiler 2 is mounted in a shaft sleeve 40. The shaft 44 is supported by a shaft support 42. The shaft 44 is connected to an actuator (not shown) configured to rotate (in the direction ω) the shaft 44 with respect to the direction of travel X as indicated in the coordinate system. In one embodiment, the body portion 30 of the spoiler 2 is configured to be rotated (in the direction φ) about the lateral axis Y as indicated in the coordinate system.

FIG. 8D illustrates a rear view of a car 4 provided with a spoiler assembly 2 having two body portions 30, 30' each being rotatably attached to an actuator 15, 15' mounted in a bracket 20, 20'. Hereby, it is possible to rotate the body portions 30, 30' (in the direction co) with respect to the direction of travel X as indicated in the coordinate system below the car 4.

By having a spoiler assembly 2 comprising two body portions 30, 30' mounted in extension of each other as illustrated in FIG. 8B and FIG. 8C, it is possible to rotate the body portions 30, 30' to a larger extent than when a single body portion of a greater length is applied.

LIST OF REFERENCE NUMERALS

2 Spoiler assembly
4 Car
6, 6' Wheel
8 Joint
10 Support structure
12 Pivot
14, 14' Cylinder portion
15, 15' Actuator
16, 16' Piston rod
18, 18' Joint
20, 20' Bracket
22 Pipe
24 Pipe
26 Rear portion
28, 28' Side portion
30, 30' Body portion
32 Bracket structure
34 Axis
36 Pivot
38 Bracket member
40, 40' Shaft sleeve
42, 42' Shaft support
44, 44' Shaft
G Ground
X, Y, Z Axis
α Angle
ω, φ Rotation
$F_{res}$ Resulting force
$F_{break}$ Breaking force
$F_{hor}$ Horizontal force
$F_{ver}$ Vertical force
$F_1, F_2, F_3, F_4, F_5$ Force
$M_1, M_2$ Torque

What is claimed is:

1. A spoiler assembly for a car, wherein the spoiler assembly comprises a support structure and a body portion moveably mounted to the support structure, wherein the support structure is configured to be attached to the car, wherein the spoiler assembly comprises one or more actuators configured to change the orientation of the body portion, and wherein the body portion is arranged to be rotated with respect to the direction of travel of the car and wherein the spoiler assembly comprises a joint that attaches the body portion to the support structure and wherein the joint is configured to articulate with respect to the direction of travel of the car and a lateral axis extending perpendicular to the direction of travel of the car.

2. The spoiler assembly of claim 1, wherein the spoiler assembly comprises one or more brackets configured to be attached to the car, wherein the support structure is attached to the one or more brackets.

3. The spoiler assembly of claim 2, wherein the one or more actuators are mounted in the one or more brackets.

4. The spoiler assembly of claim 2, wherein the one or more actuators are rotatably attached to the one or more brackets.

5. The spoiler assembly according to claim 1, wherein each of the one or more actuators is attached to an actuator joint attached to the body portion.

6. The spoiler assembly of claim 5, wherein the actuator joint is a ball joint.

7. The spoiler assembly of claim 1, wherein the one or more actuators are hydraulic.

8. The spoiler assembly of claim 1, wherein the spoiler assembly comprises two symmetrically arranged actuators.

9. The spoiler assembly of claim 1, wherein the spoiler assembly comprises a first spoiler body and a second spoiler body separated from and/or configured to be moved independently of the first spoiler body.

10. A car comprising the spoiler assembly of claim 9.

11. A car comprising the spoiler assembly of claim 1.

12. The car of claim 11, wherein the spoiler assembly is arranged at a rear of the car.

13. A method for controlling a car by means of a spoiler assembly, wherein the spoiler assembly comprises a support structure and body portion rotatably/moveably mounted to the support structure, wherein the support structure is configured to be attached to the car, wherein the method comprises the step of: applying a spoiler assembly to the car, the spoiler assembly comprising a joint that attaches the body portion to the support structure, wherein the joint is configured to allow the body portion to be rotated with respect to the direction of travel of the car and with respect to a horizontal (lateral) axis perpendicular to the direction of travel of the car;
changing the orientation of the body portion by activating one or more actuators; and
rotating the body portion with respect to the direction of travel of the car.

14. The method of claim 13 further comprising the step of controlling the position and orientation of the body portion by activating a first actuator and a second activator attached to the body portion at each side of the joint.

15. The method of claim 13 further comprising the step of controlling the position and orientation of the body portion by activating a first actuator and a second activator attached to the body portion.

16. The method of claim 13 further comprising the step of controlling the position and orientation of the body portion by activating at least one of a first actuator and a second activator attached to the body portion.

17. The method of claim 13, wherein the spoiler assembly comprises two body portions and the method comprises independently articulating the two body portions to the same orientation.

* * * * *